Feb. 25, 1936. T. R. DONLAN 2,031,939
METHOD OF TREATING HYDROCARBONS
Filed Feb. 26, 1932
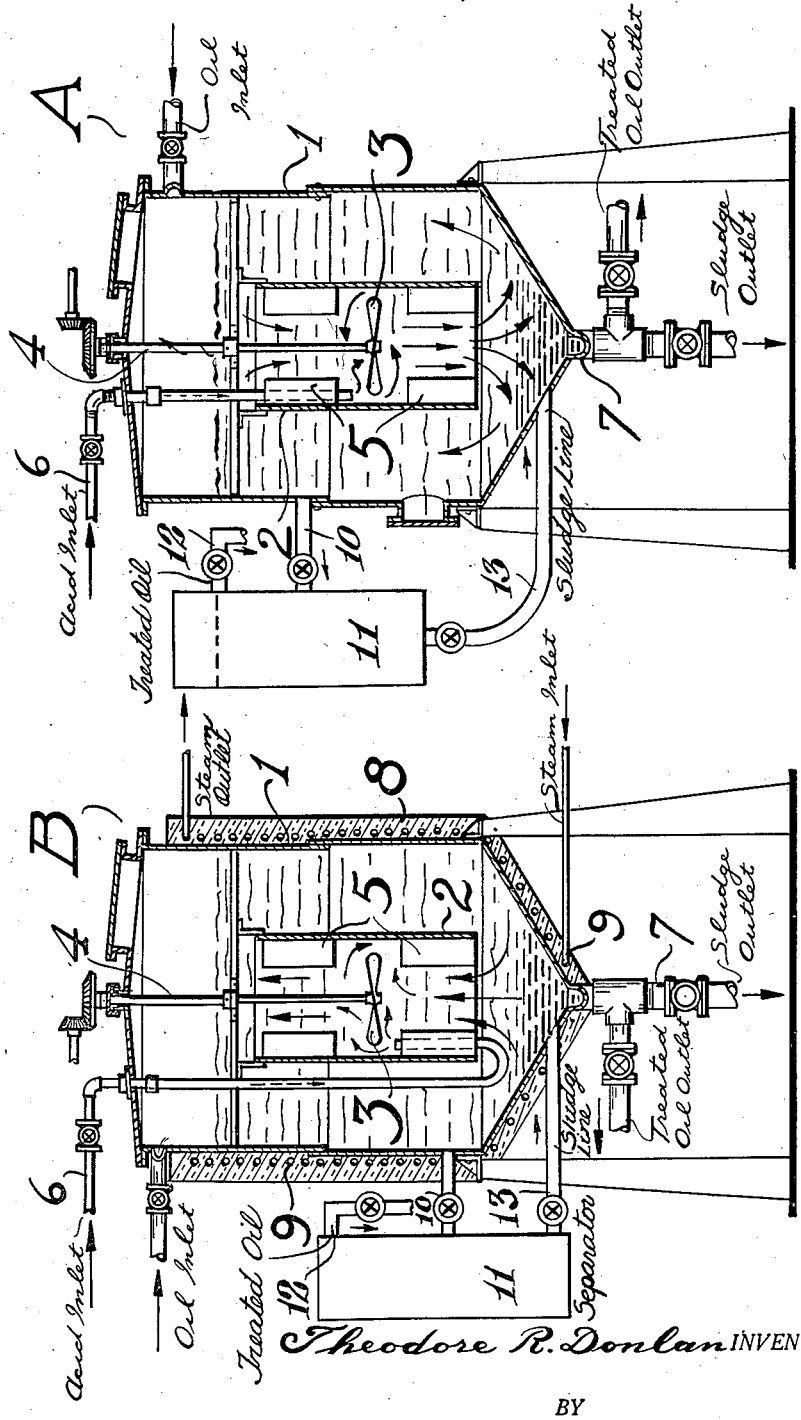
Theodore R. Donlan INVENTOR.
BY
W. E. Currie ATTORNEY.

Patented Feb. 25, 1936

2,031,939

UNITED STATES PATENT OFFICE 2,031,939

METHOD OF TREATING HYDROCARBONS

Theodore R. Donlan, Irvington, N. J., assignor to Standard Oil Development Company, a corporation of Delaware Application February 26, 1932, Serial No. 595,325

8 Claims. (Cl. 196—40)

This invention relates to a method for treating hydrocarbon oils with fuming sulfuric acid and sulfuric anhydride and relates especially to the treatment of petroleum oils with these reagents at elevated temperatures.

The refining of hydrocarbon oils with sulfuric acid has long been known but the use of fuming sulfuric acid or of sulfuric anhydride has been generally limited to very low temperatures or to the use of large proportions of inert diluents because of the highly reactive nature of these treating agents. I have now found means whereby fuming sulfuric acid and sulfuric anhydride in concentrated form may be used for purification of hydrocarbon oils without limitation as to temperature. My invention is of especial advantage in treating petroleum oil fractions, such as white oil stocks, kerosenes and the like at elevated temperatures above about 80° C. and up to the boiling point of the oil treated. The oils obtained according to my process are greatly improved as to color, odor and other characteristics over those obtained by the known refining methods.

The drawing is a diagrammatic illustration in sectional elevation of an apparatus especially adapted to my process. My invention will be fully understood from the following description of the drawing and the examples presented in relation thereto.

Referring to the drawing, numeral 1 represents a treating or agitator vessel of the type commonly used in petroleum refineries for acid treating. A cylindrical draft tube 2 open at both ends is mounted on a vertical axis within the reaction vessel. A propeller 3 is mounted within this draft tube and preferably on the same axis or on an axis substantially parallel to that of the draft tube. This propeller is rotated by power transmitted by shaft 4 from any suitable external means. Vanes 5 are fixed within the draft tube above and below the propeller to provide retarded linear flow and to prevent swirling of the liquid in the treating vessel. Pipe 6 represents a supply line by which the fuming sulfuric acid or sulfuric anhydride is supplied to the oil to be treated. This pipe discharges within the draft tube and preferably closely adjacent to the zone occupied by the revolving propeller. A draw-off line 7 is provided for removing sludge from the lower portion of the treating vessel. The treated oils may also be removed through this line or by other draw-off lines suitably placed on the side of the reaction vessel or by adjustable siphons or other means (not shown). For continuous operation, oil is drawn off at a point where it contains the least acid sludge, such as through a pipe 10 discharged into a separating chamber 11, from which acid-free oil is drawn off through a pipe 12 and sludge is drawn off through a pipe 13, which conducts it back to that portion of chamber 1 from which acid sludge is thrown off through line 7. For treating at elevated temperatures the vessel 1 may be coated with suitable heat insulation material 8 and may be heated by steam coils 9 or other suitable means.

Figure A represents a preferred form of my invention for use in treating oils with sulfuric anhydride. In this apparatus the reagent line 6 discharges within the draft tube above the propeller which is rotated to drive the oil being treated downwardly through the draft tube. This apparatus may also be coated with heat insulating material and heated by suitable means.

Figure B represents the preferred method for treating with fuming sulfuric acid. Here the reagent line 6 discharges within the draft tube below the propeller which is operated to drive the oil being treated in an upward direction through the draft tube.

By means of this type of apparatus the highly reactive treating reagent and the oil to be treated are brought into initial contact in a zone of violent agitation and are temporarily maintained in violently agitated contact until substantially complete reaction has taken place. This provides thorough mixing of the oil and reagent, causes the reaction to go smoothly and uniformly and results in increased yield of treated oil with a decreased consumption of reagent.

This type of apparatus proves especially advantageous when the treating is conducted at elevated temperatures. For example when oils are treated with sulfuric anhydride according to ordinary methods the sludge formed is usually solid or of a highly viscous nature and is very difficult to remove from the treating vessel. When the treatment is conducted in my improved apparatus, temperatures of 80 to 100° C. or even higher may be used without difficulty and treated oils of an absolutely odorless nature are obtained. In addition the sludge is liquid and settles rapidly permitting the operation of a continuous treating process with continuous withdrawal of sludge. This elevated temperature treating process may also be used to advantage for obtaining superior oil soluble sulfonic acids. These may be readily obtained by extraction of the treated oil with alcoholic alkali or by other known methods. My method of treating petroleum oils is illustrated by the following examples.

Example 1

A treating vessel of the type shown in Figure B is filled with a kerosene obtained on cracking gas oil. The kerosene is heated to about 100° C. and then five parts by volume of fuming sulfuric acid containing 20% by weight of sulfuric anhydride per hundred parts of kerosene are slowly added through the reagent supply line during constant operation of the propeller. An adsorptive and coagulating agent such as clay or bone char is then added and after thorough mixing the propeller is stopped. The clay and sludge settle rapidly as a fluid mass which is withdrawn from the bottom of the treating vessel. The acid and clay treats are twice repeated and the oil is then withdrawn, cooled, and washed with alkali and water. There is thus obtained a quite odorless kerosene of high quality and stability which is especially suitable for use in domestic insecticide sprays and other purposes.

Example 2

A treating vessel of the type shown in Figure A is filled with a heavy white oil stock which is heated to about 100° C. Commercially pure sulfuric anhydride vapor is then added slowly through the reagent supply line during constant operation of the propeller. A liquid sludge settles in the bottom of the treating vessel and is continuously withdrawn. The addition of sulfuric anhydride is continued until no further reaction occurs, as evidenced by the appearance of bubbles of sulfuric anhydride at the surface of the oil. The treatment is then stopped, the oil withdrawn, cooled and washed with alcoholic alkali and water. It may also be filtered through clay, steam distilled or subjected to other ordinary refinery treatments although these are usually unnecessary. The oil so secured is colorless, odorless and very stable and is especially suitable for use as a high quality lubricant for application to textile fibers, for internal use, for tree sprays, and the like.

Either of the processes described in the above examples may be used for the refining of kerosene or white oil stocks or other petroleum fractions. Various minor modifications in the treating processes will be readily apparent, and are within the scope of this invention.

While the above examples indicate oil treating at elevated temperatures, this apparatus is suitable for treatment at atmospheric or even lower temperatures if desired, although the products obtained are of lower quality than those produced by treating at elevated temperatures. The amount of fuming acid or of sulfuric anhydride used will vary largely according to the type of oil treated and the extent of purification desired.

In refining ordinary straight run or cracked kerosenes it is preferred to use at least 5% by weight of sulfuric anhydride, either alone or in fuming sulfuric acid. The use of an excess of sulfuric anhydride is not generally necessary to obtain an odorless kerosene, but may be used if desired. Lesser amounts of sulfuric anhydride may be used for kerosenes which have been substantially freed of impurities by prior refining or production treatments. For example, kerosenes prepared by high pressure hydrogenation or destructive hydrogenation generally require only about one-fourth to one-tenth the amount of sulfuric anhydride necessary for the treating of a non-hydrogenated kerosene stock to produce an equivalent refined kerosene. It is generally desirable to use an excess of sulfuric anhydride, alone or in fuming acid, for refining white oils, although a less amount may be used with correspondingly decreased improvement in the oil.

This invention is not to be limited to any examples, which are given herein solely for purpose of illustration, but only by the following claims in which I wish to claim all novelty insofar as the prior art permits.

I claim:

1. The process of treating a hydrocarbon oil with a reagent of the class consisting of sulfuric anhydride and fuming sulfuric acid, at a temperature above about 80° C. and below the boiling point of the hydrocarbon oil, which comprises continuously feeding said treating agent initially into a violently agitated portion of the treating zone where the hydrocarbon oil and the treating agent are maintained in a violently agitated contact long enough to permit a substantial portion of the reaction to take place, continuously removing the reacted materials to a portion of said zone of less violent agitation, removing the sludge from the hydrocarbon oil and continuously replenishing the supply of hydrocarbon oil to be treated.

2. The continuous process of treating a hydrocarbon oil with a reagent of the class consisting of sulfuric anhydride and fuming sulfuric acid, at a temperature above about 80° C. and below the boiling point of the hydrocarbon oil, which comprises continuously feeding the oil to be treated into a treating zone, continuously feeding the treating agent into a violently agitated portion of the treating zone where the treating agent is maintained in violently agitated contact with the oil long enough to permit a substantial part of the reaction to take place, continuously removing the reacted materials from said agitated portion of the treating zone to a less violently agitated portion of the treating zone, continuously circulating oil from the less violently agitated portion of said zone through the violently agitated portion of said zone and continuously removing sludge from the oil in the less violently agitated portion of the treating zone.

3. Process according to claim 1 in which an adsorptive solid of the class consisting of clay and bone char is added to the contacted oil.

4. Process according to claim 2 in which an adsorptive solid of the class of clay and bone char is added to the contacted oil.

5. Process according to claim 1 in which the treating is carried out at a temperature of about 100° C.

6. Process according to claim 2 in which the treating is carried out at a temperature of about 100° C.

7. Process according to claim 1 in which the hydrocarbon oil is a petroleum white oil stock and the treating is carried out at a temperature at which a fluid self-settling sludge is produced.

8. Process according to claim 2 in which the hydrocarbon oil is a petroleum white oil stock and the treating is carried out at a temperature at which a fluid self-settling sludge is produced.

THEODORE R. DONLAN.